United States Patent [19]

Thallinger

[11] Patent Number: 4,559,253
[45] Date of Patent: Dec. 17, 1985

[54] FOLDABLE COMPOSITE PANEL INCLUDING MEANS FOR RENDERING IT RIGID

[76] Inventor: Daniel J. Thallinger, 2 rue Albert de Mun, 92190 Meudon Bellevue, France

[21] Appl. No.: 630,960

[22] Filed: Jul. 17, 1984

[51] Int. Cl.$^4$ .............................................. G09F 11/04
[52] U.S. Cl. ......................................... 428/65; 40/495
[58] Field of Search .......................... 428/8, 12, 64, 65; 40/495

[56] References Cited

U.S. PATENT DOCUMENTS

| | | | |
|---|---|---|---|
| 1,714,159 | 5/1929 | Crawford | 40/495 |
| 2,932,104 | 4/1960 | Corbett | 428/64 X |
| 3,718,519 | 2/1973 | Montgomery | 428/65 X |
| 3,820,263 | 6/1974 | Clark | 40/495 |
| 4,323,609 | 4/1982 | Bromberg | 428/65 X |

Primary Examiner—Henry F. Epstein
Attorney, Agent, or Firm—McGlew and Tuttle

[57] ABSTRACT

This foldable composite panel comprises a core of a rigid material divided into an even number of equal areas by articulation devices, a rotary element centered on the core and also made from a rigid material and including articulation devices, the rotary element being angularly movable between a first position in which the articulation devices of the rotary element and the articulation devices of the core are coincident, and a second position in which the articulation devices of the rotary element and the core do not coincide, the core and the rotary element being sandwiched between two lateral sheets. The articulation devices of the core and rotary element are rectilinear and are preferably orthogonal and corresponding.

10 Claims, 5 Drawing Figures

FOLDABLE COMPOSITE PANEL INCLUDING MEANS FOR RENDERING IT RIGID

FIELD AND BACKGROUND OF THE INVENTION

The present invention relates to a foldable composite panel which is capable of being rendered mechanically rigid in various configurations.

In order to clearly indicate the nature of the invention, there may be mentioned, among the many possible applications, by way of a non-limiting example, mobile signalling means on highways.

Up to the present time there have been used for this purpose rigid panels which are in a single piece and are large in size and maintained by a detachable or foldable leg.

Owing to their size, these panels are space-consuming and in order to be rigid, they must be made from a material (sheet metal, wood or other material) having a certain thickness and consequently these panels are also heavy.

SUMMARY OF THE INVENTION

These panels may be replaced by foldable panels according to the invention which are rendered rigid for the period of use and may be thereafter folded up so as to be conveniently in a small volume for a subsequent use.

An object of the invention is therefore to provide a composite sheet or panel which may be folded up and unfolded and is adapted to be rendered immediately rigid without the use of separate exterior tools or elements and which, in the folded up state, has only a fraction of its total area in the unfolded state, for a constant volume.

The invention therefore provides a foldable composite panel comprising a core of a rigid material divided into an even number of equal areas by articulation means, a rotary element centered on said core and also of a rigid material including articulation means, said rotary element being angularly movable between a first position in which the articulation means of the disc and the core coincide and a second position in which said articulation means do not coincide, the core and the rotary element being sandwiched between two lateral sheets.

The articulation means of the core and the rotary element are rectilinear and preferably orthogonal and corresponding.

According to another feature of the invention, the core has a circular annular opening and the rotary element is an annular disc having a width equal to the width of said opening and rotatively mounted in said opening between said lateral sheets.

According to yet another feature of the invention, the disc constituting the rotary element has a radial actuating tab projecting from its periphery, and the core has two abutments defining the two angular positions of the disc.

Preferably, the core and the rotary element are made from a suitable plastics material and said articulation means are formed by material-weakening lines.

According to another embodiment of the invention, the core is formed by an even number of separate elements adhered to said lateral sheets and defining a central opening in which the rotary element is freely disposed.

Advantageously, said abutments defining the angular positions of the rotary element are formed by a passage cut into the core between the central opening and one of its edges, said radial tab extending into said passage.

It will be understood that, with this arrangement, when the articulation means no longer coincide, the folding lines are interrupted and the rotary element opposes the folding and thus locks the assembly in a rigid state.

The following description, with reference to the accompanying drawing given by way of a non-limiting example, will explain how the present invention can be carried out.

DESCRIPTION OF THE PREFERRED EMBODIMENTS

Figure 1:
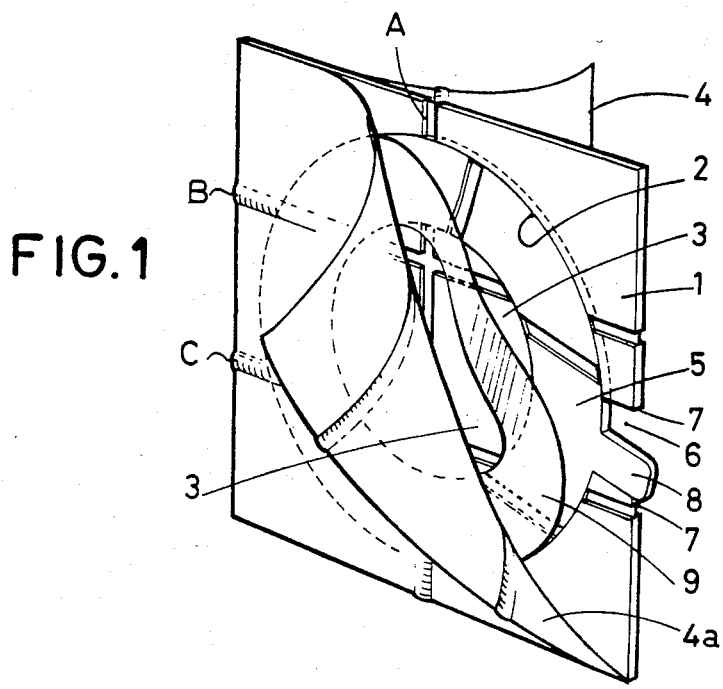
FIG. 1 is a perspective assembly view, with a part cut away, of a foldable composite panel according to the invention.

With reference to the drawings, it can be seen in FIG. 1 that the foldable panel according to the invention comprises a core plate 1 which is formed, according to the illustrated embodiment, by a sheet of a suitable plastics material including articulation or hinge means which are advantageously formed by three orthogonal weakening grooves A, B, C, which are provided in an identical manner in each side of the sheet 1.

The sheet 1 has a circular annular opening 2 defining a central circular part 3.

The sheet 1 and said central circular part are adhered to a lateral sheet 4 of flexible material, for example a sheet of plastics material.

Disposed in the annular gap 2 around the central part 3 is a rotary plate or element 5 of annular shape so that it is capable of rotating about the central part 3. This rotary element is also, but not necessarily, made from the same plastics material as the core 1 and also includes articulation means which are also formed by orthogonal weakening grooves D,E,F provided in an identical manner on both sides of the rotary element in a design corresponding to that of the grooves A, B, C of the sheet 1.

Formed in one edge of the sheet 1 is a passage 6 defined by two edges 7 constituting elements for a radial tab 8 projecting from the periphery of the rotary element 5 and extending outwardly through this passage.

Preferably, an interposed annular sheet 9 of a synthetic material having a low coefficient of friction is provided between the lateral cover sheet 4 and the rotary element 5, a sheet identical to the sheet 9 being interposed between the rotary element 5 and a second lateral sheet 4a which is adhered, as the sheet 4, to the opposite side of the sheet 1 and to the opposite side of the central part 3.

Owing to this arrangement, the annual rotary element 5 can freely rotate in the gap 2 between the two lateral sheets 4, 4a.

Figure 2:
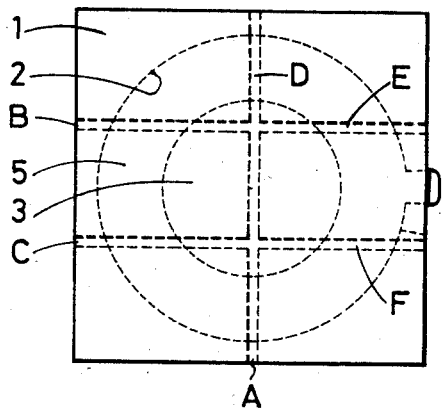
FIG. 2 is a plan view of the foldable panel of FIG. 1, showing the arrangement of the folding means of the core and the rotary element in coinciding positions before the folding up of the panel.
Figure 3:
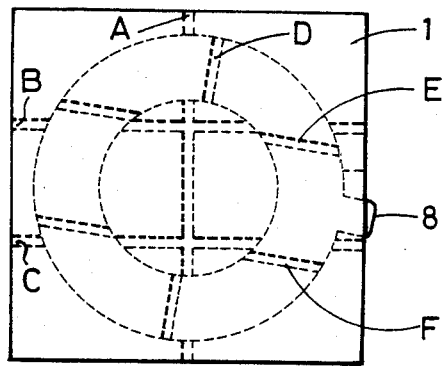
FIG. 3 is a view similar to FIG. 2 showing the rotary element in a position for locking the panel in the rigid state.
Figure 4:
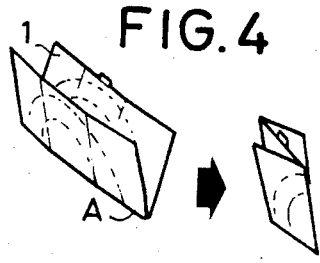
FIG. 4 shows two folding stages of the panel of FIG. 2.

FIGS. 2 and 3 show the two angular positions of the rotary element 5. In the first position (FIG. 2), the folding means A, B, C of the core 1 and the folding means D, E, F of the rotary element 5 are in coincidence and the panel can be folded up, for example along the groove A in a first stage, and then along the grooves B and C in a second and a third stage.

In the second position (FIG. 3), the rotary element 5 has been angularly shifted by means of the tab 8 and the grooves D,E,F no longer coincide with the grooves A,B,C of the core 1 and the latter is thus locked in a rigid state.

It can be seen that, with three folding means lines, the panel according to the invention can be folded up so as to occupy only one sixth of its total unfolded area, its volume remaining the same.

Figure 5:
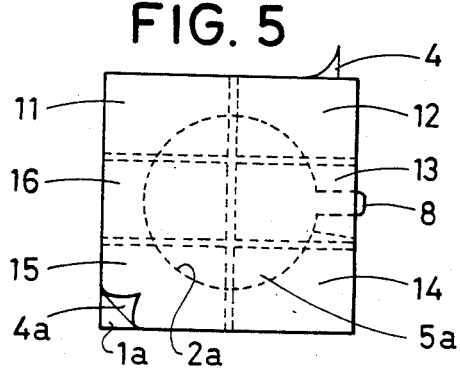
FIG. 5 is a view of a modification of the invention.

FIG. 5 shows a modification in which the rotary element 5a is a solid disc instead of being a flat ring, the core 1a being formed by six separate elements 11, 12, 13, 14, 15 and 16 shaped in such manner as to define a circular central opening 2a and adhered to lateral sheets 4 and 4a, the disc 5a being placed in this opening, the articulation means being formed by gaps between the elements and by the two flexible lateral sheets constituting hinges.

It will be understood that the panel according to the invention may be used in many applications, with different dimensions. It may for example be employed as a support for road maps, be integrated within the wall of a flexible bag so as to render the latter rigid when desired, etc. Further, when partly folded up along only one of its articulation means, it remains rigid and can have, as desired, a more or less open V or L shape.

When folded into a V shape and held in the hand, it can be used to protect the head from rain. It may also receive pictures or the like on both sides and act, for example, as a rigid sheet for games, for example, as a board for chess or draughts or some other game.

What is claimed is:

1. A foldable composite panel comprising a rigid core plate defining a circular central opening, a rigid rotary disc plate having a circular disc shape matching with and nested in said circular opening, said core plate and said rotary plae being provided with a plurality of corresponding rectilinear hinge means, and flexible cover sheets between which both said core plate and rotary plate are sandwiched, said rotary plate being angularly movable in relation to said core plate between a first position in which said hinge means of said core and rotary plates are in alignment, and a second position in which said hinge means are out of alignment.

2. A foldable composite panel as claimed in claim 1, wherein said rectilinear hinge means each include at least two orthogonal portions.

3. A foldable composite panel as claimed in claim 2, wherein said circular opening in said core plate is of annular shape and said rotary plate is of annular shape having a radial width equal to a radial width of said opening.

4. A foldable composite panel as claimed in claim 3, wherein said rotary plate includes a radially extending actuating tab projecting from a periphery of said rotary plate, and said core plate includes a passage for receiving said tab and for defining two abutments for said first and second positions of said rotary plate.

5. A foldable composite panel as claimed in claim 1, wherein said core and the rotary plates are made of a plastic material and said hinge means are formed of material-weakening lines.

6. A foldable composite panel as claimed in claim 2, wherein said core plate comprises an even number of separate plate portions adhered to said flexible cover sheets and defining said central opening in which said rotary plate is nested for the rotation.

7. A foldable composite panel as claimed in claim 4, wherein said abutments are formed by said passage provided in said core plate between said central opening and one outer edge of said core plate, said radial tab extending through said passage.

8. A foldable composite panel as claimed in claim 2, further comprising a low friction material sheet separating said rotary plate from each of said flexible cover sheets.

9. A foldable panel comprising a core plate having a circular opening, a rotary plate mounted for rotation in said circular opening, and a pair of cover sheets covering lateral sides of said core and rotary plates and being attached to said core plate only for permitting relative rotation between said rotary plate and said core plate, said core plate having at least one straight hinge for permitting folding of said core plate and said rotary plate having at least one straight hinge for permitting folding of said rotary plate, said rotary plate having a first angular position with said hinges of said core and rotary plate aligned for permitting folding of said core and rotary plates, said rotary plate having a second annular position with said hinges of said core and rotary plates misaligned to prevent folding of said core and rotary plates.

10. A foldable panel according to claim 9, wherein said hinges of said core and rotary plates comprise a thin weakened area of said core and rotary plates respectively, said core plate including a passage extending to said central opening, said rotary plate having a radial tab extending in said passage, said passage defining opposite abutment edges against which said tab engages with rotation of said rotary plate for establishing said first and second angular positions of said rotary plate.

* * * * *